US012217272B2

(12) United States Patent
Vinogradov et al.

(10) Patent No.: US 12,217,272 B2
(45) Date of Patent: Feb. 4, 2025

(54) SYSTEMS, METHODS, AND DEVICES FOR AUTHENTICATION OF A PRODUCT

(71) Applicant: eBay Inc., San Jose, CA (US)

(72) Inventors: Alan Vinogradov, Nyack, NY (US); Barris Vinogradov, Brooklyn, NY (US)

(73) Assignee: eBay Inc.v, San Jose, CA (US)

( * ) Notice: Subject to any disclaimer, the term of this patent is extended or adjusted under 35 U.S.C. 154(b) by 0 days.

(21) Appl. No.: 18/063,542

(22) Filed: Dec. 8, 2022

(65) Prior Publication Data

US 2023/0104498 A1 Apr. 6, 2023

Related U.S. Application Data

(63) Continuation of application No. 16/436,850, filed on Jun. 10, 2019, now abandoned.
(Continued)

(51) Int. Cl.
*G06Q 30/018* (2023.01)
*G06K 19/07* (2006.01)
(Continued)

(52) U.S. Cl.
CPC ..... *G06Q 30/0185* (2013.01); *G06K 19/0723* (2013.01); *G06K 19/10* (2013.01); *G06Q 20/40145* (2013.01); *G06K 7/10722* (2013.01)

(58) Field of Classification Search
CPC .......... G06Q 30/0185; G06Q 20/3674; G06K 19/0723; G06F 21/44
See application file for complete search history.

(56) References Cited

U.S. PATENT DOCUMENTS 8,884,764 B2 * 11/2014 Forster ............... G08B 13/2431
340/572.1
9,053,491 B2 7/2015 Platek et al.
(Continued)

FOREIGN PATENT DOCUMENTS

KR 20090067293 A * 6/2009
TW 200926730 A 6/2009

OTHER PUBLICATIONS

108119953, "Foreign Office Action", TW Application No. 108119953, Sep. 8, 2023, 5 pages.
(Continued)

*Primary Examiner* — Sonji N Johnson
(74) *Attorney, Agent, or Firm* — FIG. 1 Patents

(57) ABSTRACT

A system, a method, and a device for authentication of a product includes one or more databases configured to store data of one or more products, and a user device communicatively coupled to the databases via a network. The user device includes at least one memory configured to store computer executable instructions, and at least one processor configured to execute the computer-executable instructions to receive, from an authenticator, product search data of the product, and to search the product in the databases based on the product search data. The product is listed by a user for authentication, and the product is authenticated by scanning an authentication tag attached to the product. The authentication tag is pre-programmed and becomes inactive when detached from the product. There is also a dual-purpose device for authenticating a commercial product and associating a brand with the authentication of the product.

20 Claims, 17 Drawing Sheets

Related U.S. Application Data

(60) Provisional application No. 62/682,926, filed on Jun. 9, 2018, provisional application No. 62/682,924, filed on Jun. 9, 2018, provisional application No. 62/682,923, filed on Jun. 9, 2018.

(51) Int. Cl.
*G06K 19/10* (2006.01)
*G06Q 20/40* (2012.01)
*G06K 7/10* (2006.01)

(56) References Cited

U.S. PATENT DOCUMENTS

| | | | |
|---|---|---|---|
| 9,836,934 B2* | 12/2017 | Joseph | G06Q 30/06 |
| 2003/0141358 A1 | 7/2003 | Hudson et al. | |
| 2008/0065514 A1 | 3/2008 | Eaton et al. | |
| 2009/0090773 A1* | 4/2009 | Tokunaga | H04Q 9/00 |
| | | | 235/383 |
| 2009/0158404 A1 | 6/2009 | Hahn | |
| 2010/0156642 A1 | 6/2010 | Lindsay et al. | |
| 2011/0166928 A1 | 7/2011 | Robinson et al. | |
| 2012/0179517 A1 | 7/2012 | Tang et al. | |
| 2013/0303085 A1* | 11/2013 | Boucher | H04W 12/069 |
| | | | 455/41.1 |
| 2014/0008429 A1 | 1/2014 | Wang et al. | |
| 2015/0269593 A1 | 9/2015 | Le | |
| 2016/0012503 A1 | 1/2016 | Fu | |
| 2016/0267493 A1 | 9/2016 | Liu | |
| 2018/0276432 A1* | 9/2018 | Manickam | G06K 7/10366 |

OTHER PUBLICATIONS

108119953, "Foreign Office Action", TW Application No. 108119953, Mar. 15, 2023, 6 pages.
108119953, "Foreign Office Action", TW Application No. 108119953, Oct. 17, 2022, 7 pages.
U.S. Appl. No. 16/436,850, filed Feb. 1, 2022, "Final Office Action", U.S. Appl. No. 16/436,850, filed Feb. 1, 2022, 16 pages.
U.S. Appl. No. 16/436,850, filed Sep. 21, 2022, "Non-Final Office Action", U.S. Appl. No. 16/436,850, filed Sep. 21, 2022, 12 pages.
PR Newswire, "Chronicled, Inc. Announces Series Seed Financing: Chronicled is Knocking Out the Billion Dollar Counterfeit Market", PR Newswire, Cision US Inc. [online][retrieved Jul. 14, 2022]. Retrieved from the Internet <https://www.prnewswire.com/news-releases/chronicled-inc-announces-series-seed-financing-300232912.html>, Mar. 9, 2016, 2 pages.
Rhone, Nedra, "The Greatest Sneaker Show on Earth returns to Atlanta", Talk of the Town Blog, The Atlanta Journal-Constitution [online][retrieved Jul. 14, 2022]. Retrieved from the Internet <https://www.ajc.com/blog/talk-town/the-greatest-sneaker-show-earth-returns-atlanta/oKzjPwONzuGaRMXCvIWv3H/>, Sep. 20, 2017, 10 pages.
108119953, "Notice of Allowance", TW Application No. 108119953, Dec. 6, 2023, 3 pages.
U.S. Appl. No. 29/883,381, "Notice of Allowance", U.S. Appl. No. 29/883,381, Nov. 7, 2024, 6 pages.

* cited by examiner

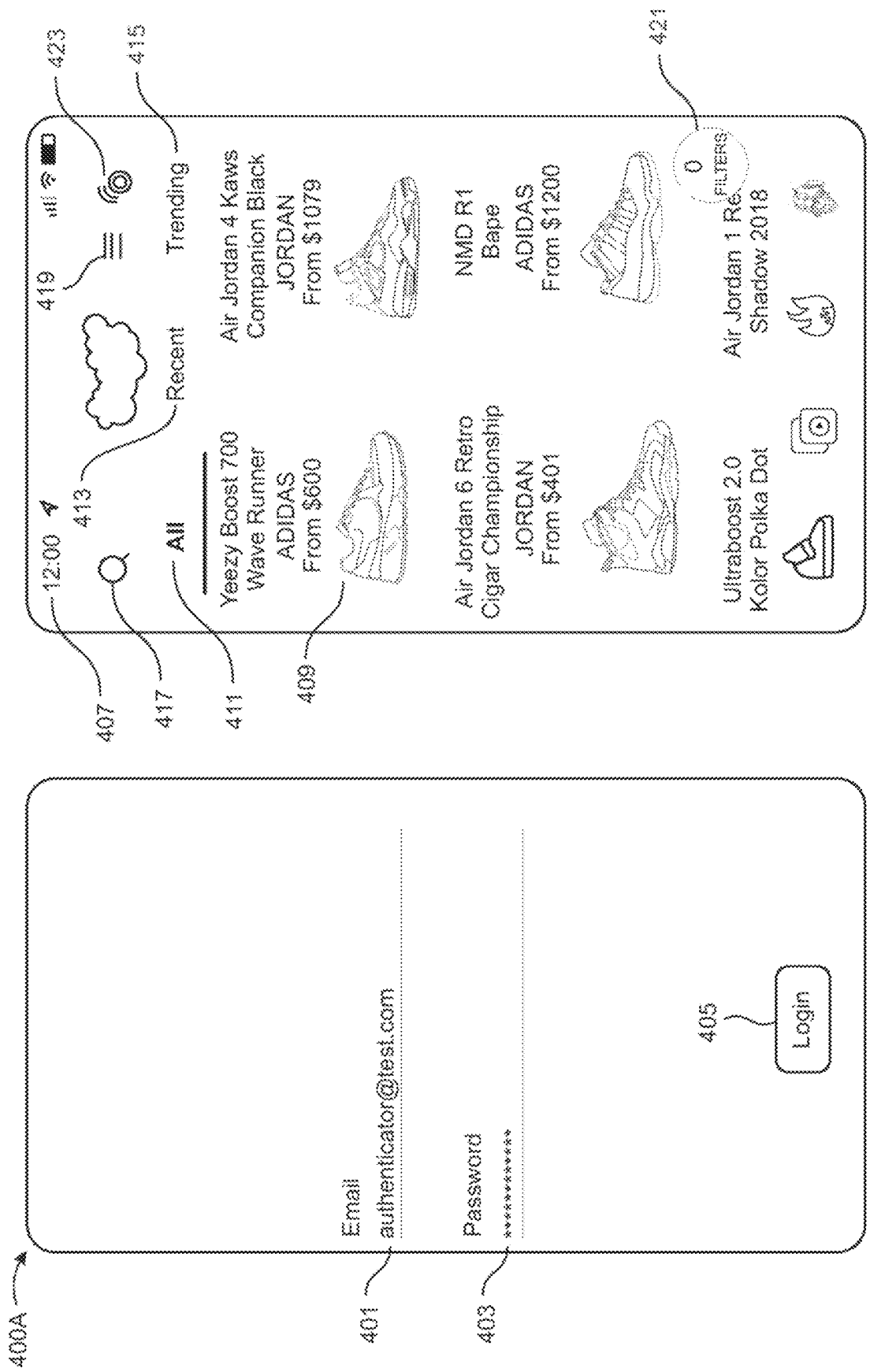

SYSTEMS, METHODS, AND DEVICES FOR AUTHENTICATION OF A PRODUCT

PRIORITY

This application is a continuation of and claims priority to U.S. patent application Ser. No. 16/436,850, filed on Jun. 10, 2019, which claims priority to U.S. Provisional Patent Application Ser. No. 62/682,926, filed on Jun. 9, 2018, U.S. Provisional Patent Application Ser. No. 62/682,924, filed on Jun. 9, 2018, and U.S. Provisional Patent Application Ser. No. 62/682,923, filed on Jun. 9, 2018, the disclosures of which are hereby incorporated by reference in their entireties.

BACKGROUND

The present disclosure generally relates to systems for authenticating a product.

In the industrial and consumer goods industries, whether original sale or resale of goods, counterfeit or otherwise inauthentic goods is and has been a problem. In counterfeiting activities, a party manufactures, sells or distributes inauthentic goods or products to misrepresent them as being authentic. In the resale industry, where goods that have already been purchased from a manufacturer are resold, the need to authenticate a product is especially important. One example of that resale industry is sneaker resale industry.

In most cases, the quality of a counterfeit good is less than the original product. Branded products, certified products and copyrighted products are usual targets of such counterfeiting activities. Generally, original products which are manufactured in large scale are distributed to consumers via distribution and sales channels. Counterfeits are then introduced into those distribution and sales channels, and consumers may purchase the counterfeits unknowingly. The counterfeiting impacts negatively on business entities, in terms of revenue, profit. Further counterfeiting can cause considerable damage to a company's reputation. As globalization continues, authentication of products becomes increasingly important, and supply chains are extended further into developing countries that lack the ability to detect and prevent counterfeiting.

SUMMARY

An effective solution is offered by a system, a method, and a device for authentication of a product. In one aspect, a system for authentication of a product includes one or more databases configured to store data of one or more products; and a user device communicatively coupled to the one or more databases. The user device includes at least one memory configured to store computer executable instructions and at least one processor configured to execute the computer executable instructions. The at least one processor is configured to execute the computer executable instructions to receive from an authenticator, product search data of the product and search the product in the one or more databases based on the product search data. The product is listed by a user for authentication. The at least one processor is further configured to authenticate the product by scanning an authentication tag attached to the product. The authentication tag is pre-programmed and becomes inactive when detached from the product.

According to example embodiments, the at least one processor is further configured to control a display device to display data of the product based on scan of the authentication tag. The data associated with the product may include one or more of types of the product, colors, dimensions, or purchase data. The at least one processor may also be further configured to provide an authentication mark in the data of the product, based on the authentication of the product.

According to other example embodiments, the at least one processor is further configured to verify that the authenticator is qualified to perform the authentication. To receive product search data, the at least one processor may also be configured to receive login credentials of the authenticator; provide a user-search window to receive from the authenticator, user-search data of the user; search the user in the one or more databases based on the user-search data. The user is one of listed users; and provides a product-search window to receive, from the authenticator, product-search data of the product. The login credentials may include one or more of a user name and a password, facial scan data, finger scan data or retinal scan data.

According to other example embodiments, the authentication tag is one of a bar code, a QR code, a holographic image, or a near field communication authentication tag. The product may be a subject of a sale transaction or a resale transaction. The subject of the sale or resale transaction may be a sneaker. The at least one processor may be further configured to receive the product search data of the sneaker; search the sneaker in the one or more databases based on the product search data; and authenticate the sneaker by scanning an authentication tag attached to the sneaker.

In another aspect, a method for authentication of a product includes receiving from an authenticator, product search data of the product; searching the product in one or more databases based on the product search data. The product is listed by a user for authentication, and authenticating the product occurs by scanning an authentication tag attached to the product. The authentication tag is pre-programmed and becomes inactive when detached from the product.

According to example embodiments, the method further includes displaying data of the product based on scan of the authentication tag. The data of the product may include one or more of types of the product, colors, dimensions, or purchase data. The method may further include providing an authentication mark in the data of the product, based on the authentication of the product. The method may further include verifying that the authenticator is qualified to perform the authentication.

According to other example embodiments, the step of receiving the product search data may include receiving login credentials of the authenticator, and providing a user-search window to receive, from the authenticator, user-search data of the user and searching the user in the one or more databases based on the user-search data. The user is one of listed users, and there may be a step of providing a product-search window to receive, from the authenticator, product-search data of the product. The login credentials may include one or more of a user name and a password, facial scan data, finger scan data or retinal scan data. The authentication tag may include one of a bar code, a QR code, a holographic image, or a near field communication authentication tag. The product may be a subject of a sale transaction or a resale transaction, and those transactions may involve a sneaker.

According to other example embodiments, the method further includes receiving the product search data of the sneaker; searching the sneaker in the one or more databases based on the product search data and authenticating the sneaker by scanning an authentication tag attached to the sneaker.

In yet another aspect, an authentication device includes at least one memory configured to store computer executable instructions and at least one processor configured to execute the computer executable instructions to receive from an authenticator, product search data of a product and search the product in one or more databases based on the product search data. The product is listed by a user for authentication. The at least one processor is further configured to authenticate the product by scanning an authentication tag attached to the product. The authentication tag is pre-programmed and becomes inactive when detached from the product.

According to example embodiments, the at least one processor is further configured to display data of the product based on the scan of the authentication tag. The data of the product may include one or more of a type of the product, colors, dimensions, or purchase data. The at least one processor is further configured to verify that the authenticator is qualified to perform the authentication.

According to other example embodiments, to receive the product search data, the at least one processor is configured to: receive login credentials of the authenticator, provide a user-search window to receive, from the authenticator, user-search data of the user and search the user in the one or more databases based on the user-search data. The user is one of listed users and the at least one processor is further configured to provide a product-search window to receive, from the authenticator, product-search data of the product.

According to other example embodiments, the login credentials include one or more of a user name and a password, facial scan data, finger scan data or retinal scan data. The authentication tag may include one of a bar code, a QR code, a holographic image, or a near field communication authentication tag. The product may be a subject of a sale transaction or a resale transaction, and the subject of those transactions may be a sneaker.

According to other example embodiments, the at least one processor is further configured to receive the product search data of the sneaker, search the sneaker in the one or more databases based on the product search data, and authenticate the sneaker by scanning an authentication tag attached to the sneaker.

In yet another aspect, a dual-purpose device for authenticating a commercial product and associating a brand with the authentication of the product includes a body that encloses programmable circuitry, and an elongate connector that couples the body to the commercial product. The circuitry is programmed to communicate an indication of authenticity to a potential purchaser. The body includes an expanse that can receive and present branding information to the potential purchaser, thereby to allow the potential purchaser to associate a brand with the authenticity.

According to example embodiments, the circuitry is programmed to stop communicating if the connector is decoupled from the product. The body may have a top, bottom and side surfaces that define a three-dimensional shape. The shape may be chosen from the group consisting of a sphere, torus, cylinder, cone, cube, cuboid, triangular pyramid, square pyramid, and triangular prism. The shape of the authentication tag may be a disc. The connector may be formed with opposing ends, with a first end being detachably connected to the body, threadable through a part of the product, and reattachable to the body, thereby to couple the body to the product.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
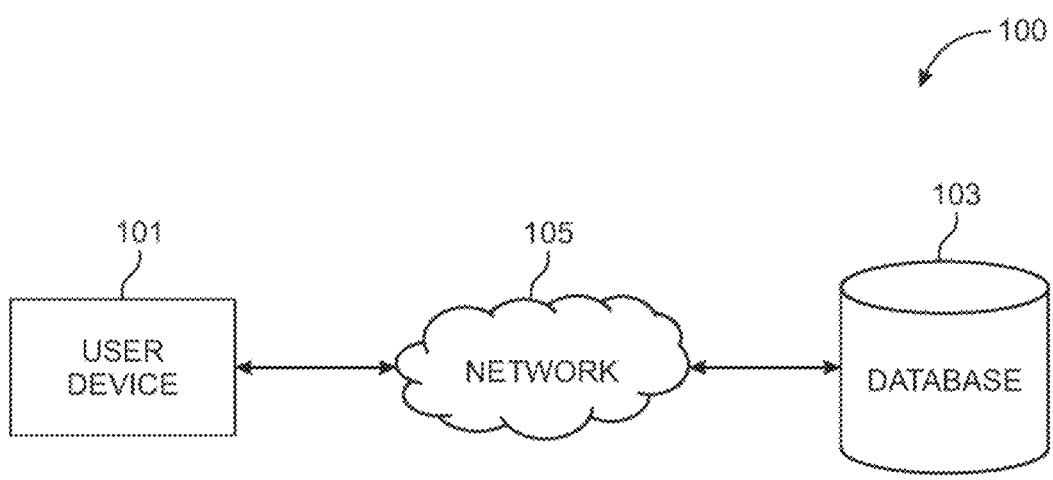
Figure 2:
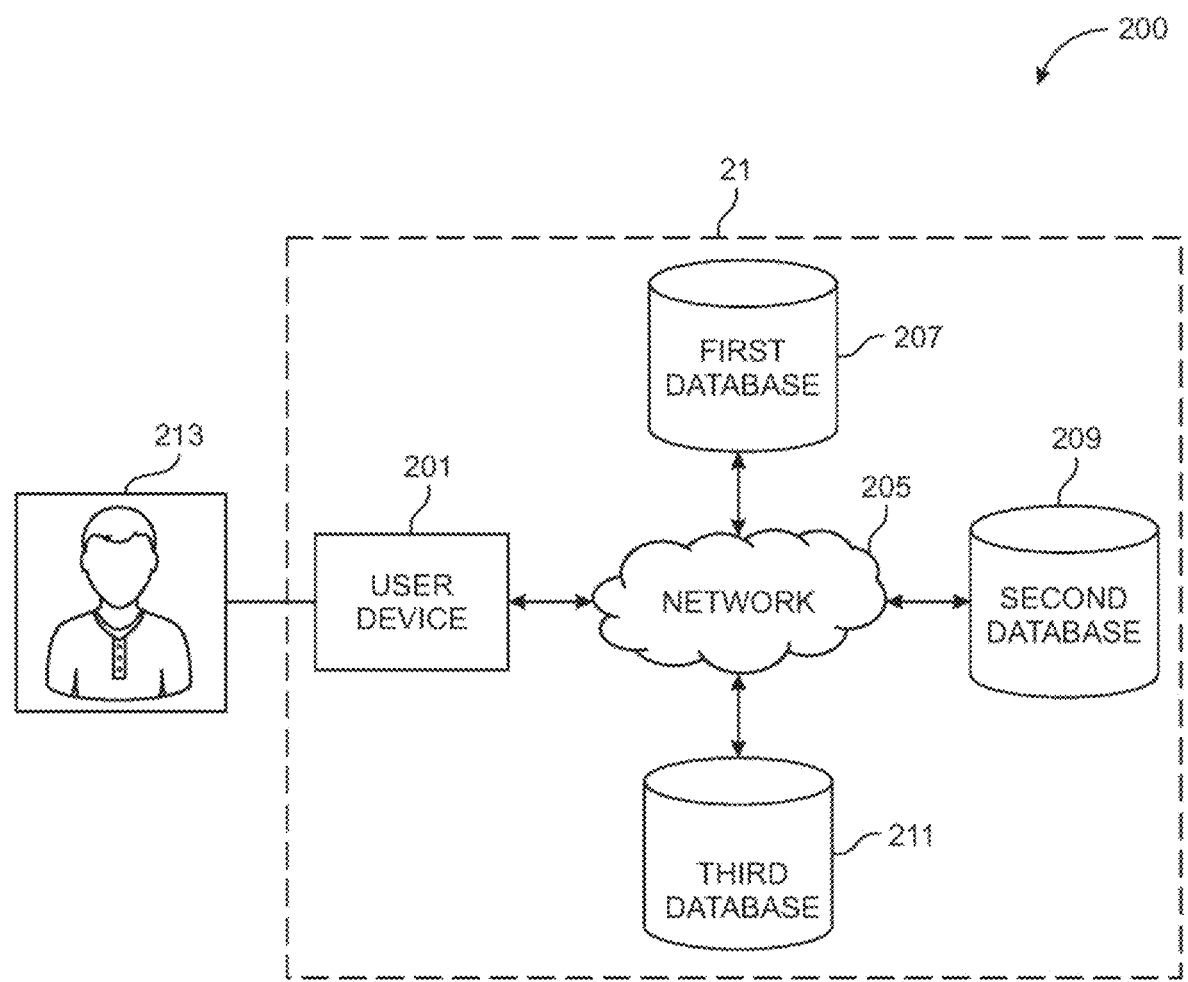
Figure 3:
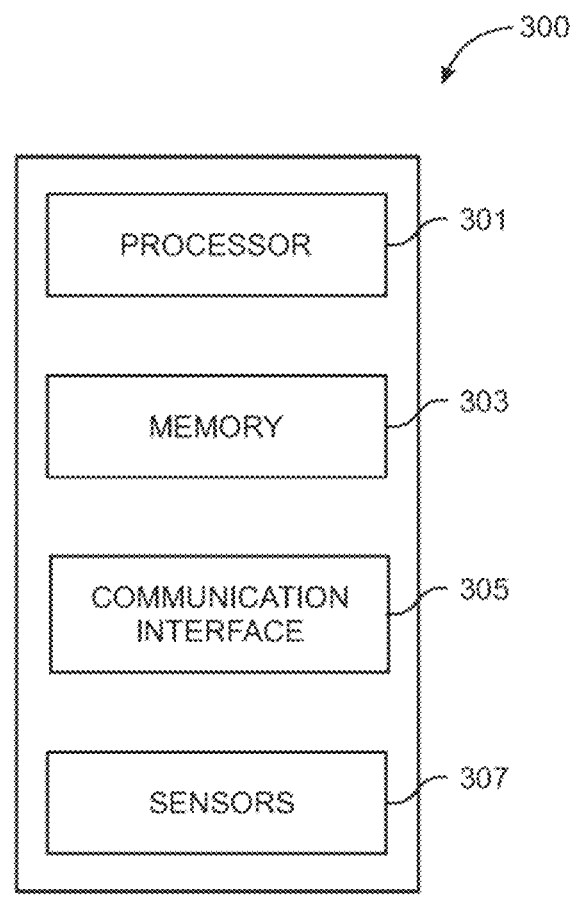
Figure 4B:
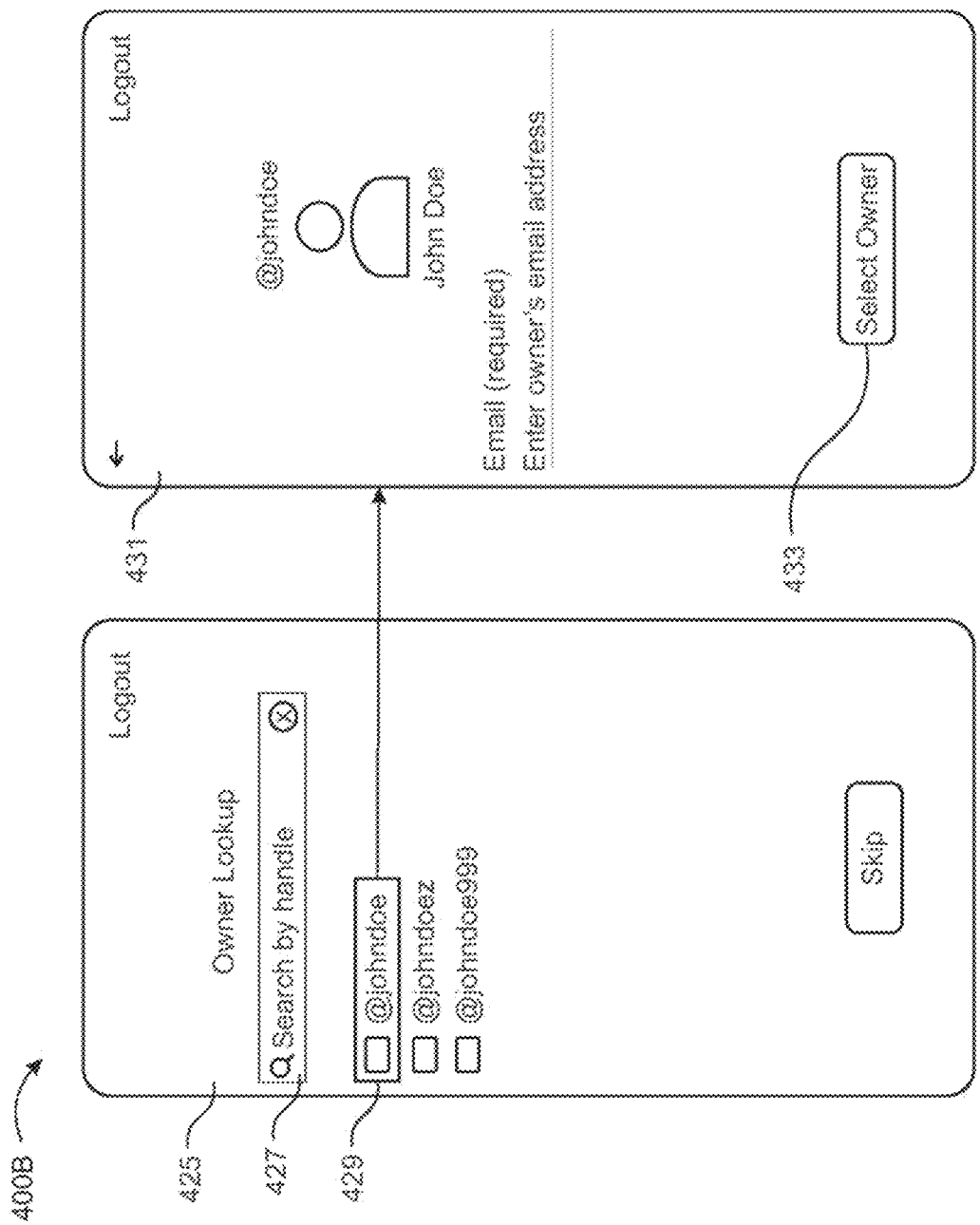
Figure 4C:
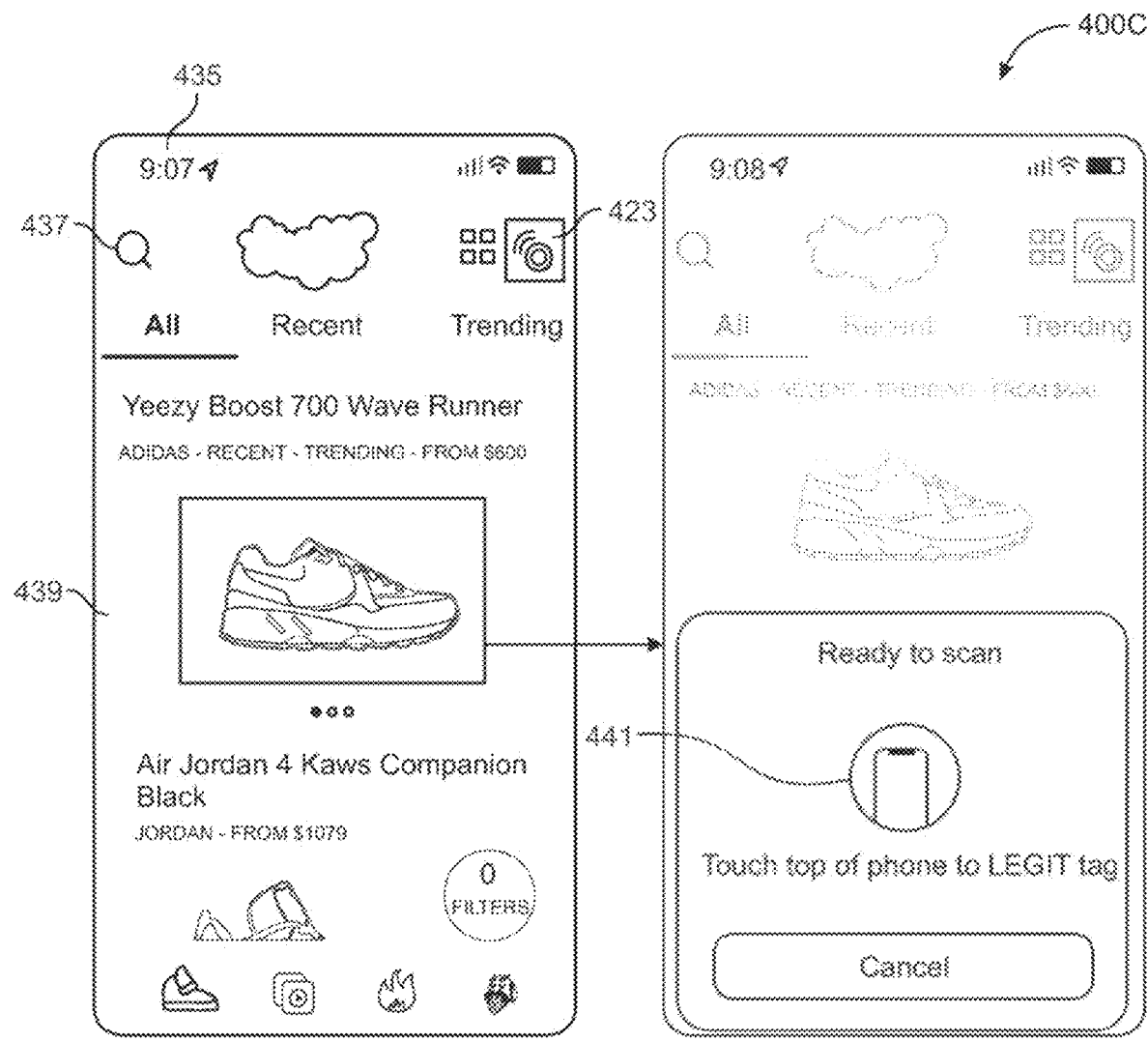
Figure 5:
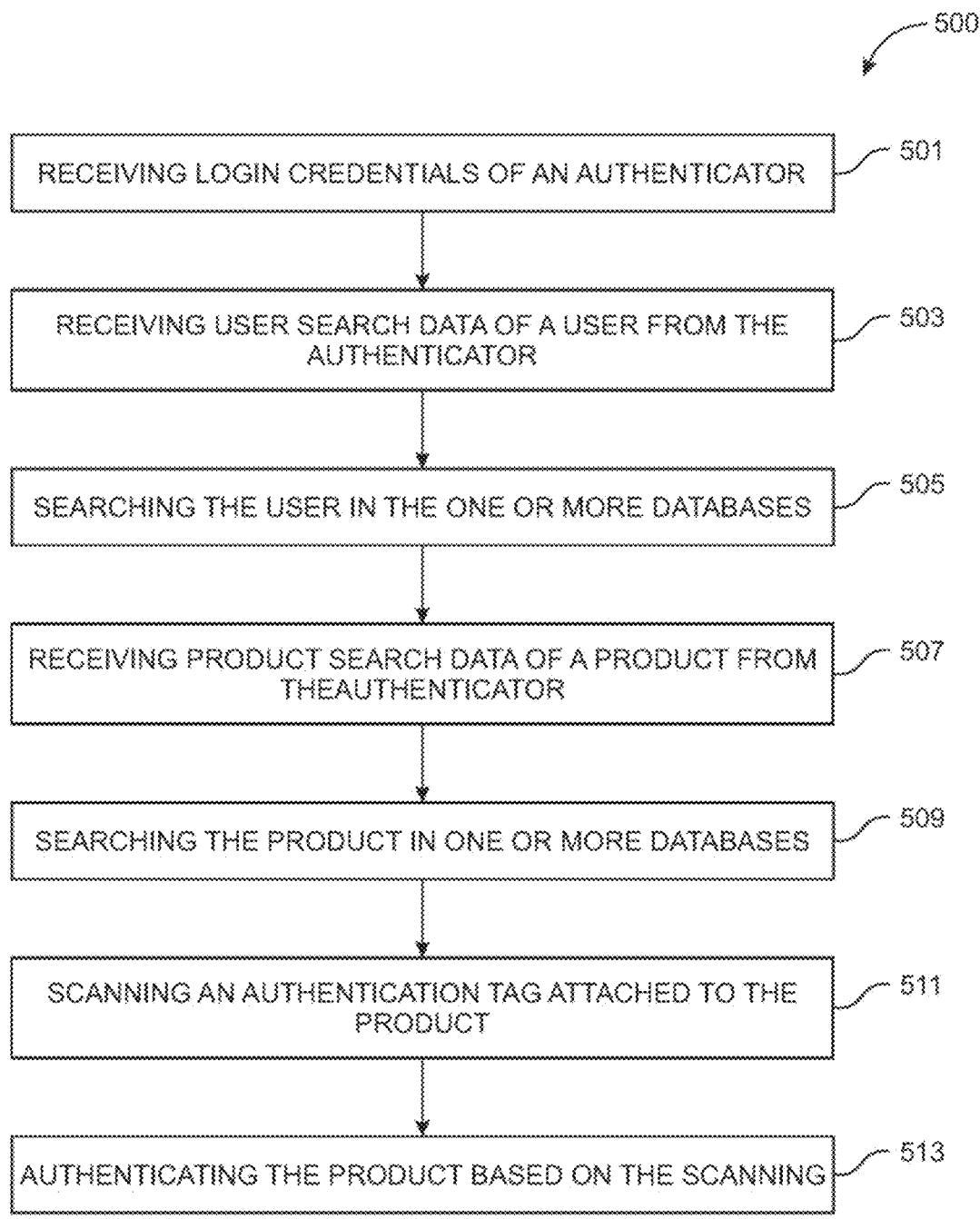
Figure 6A:
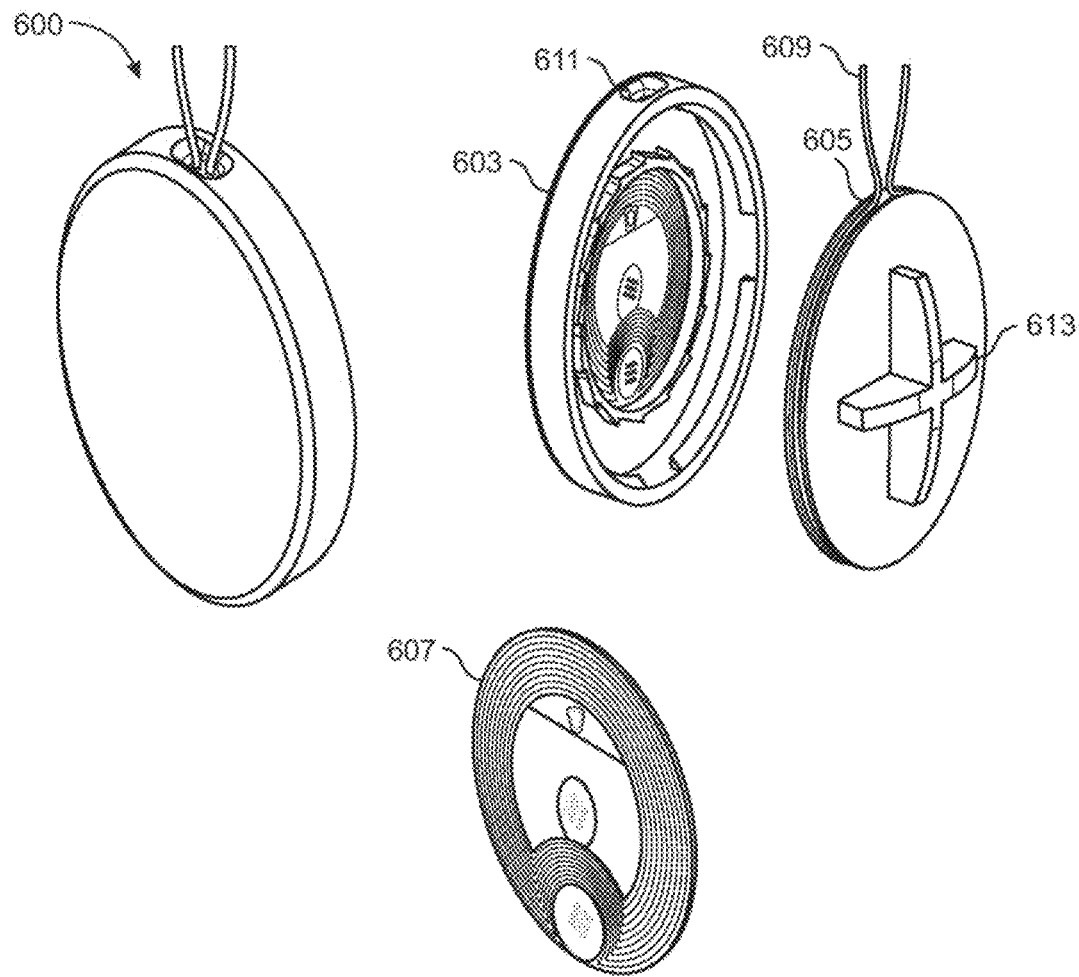
Figure 6B:
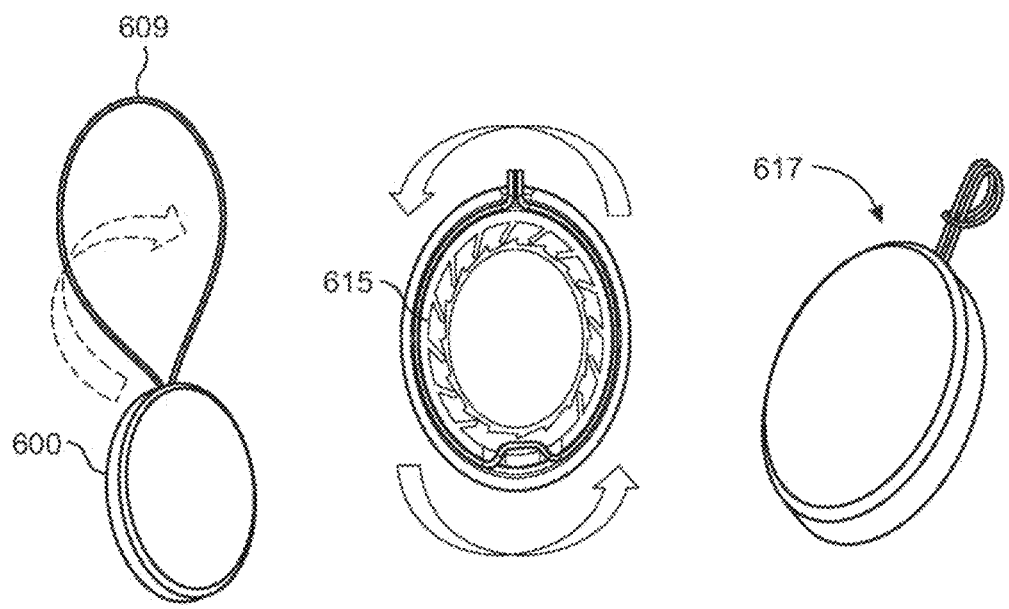
Figure 7A:
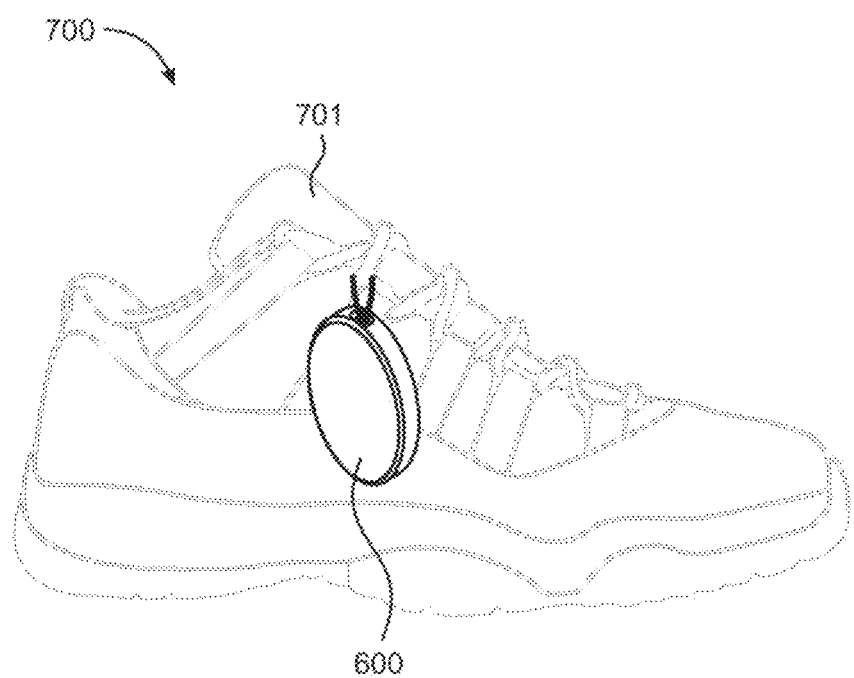
Figure 7B:
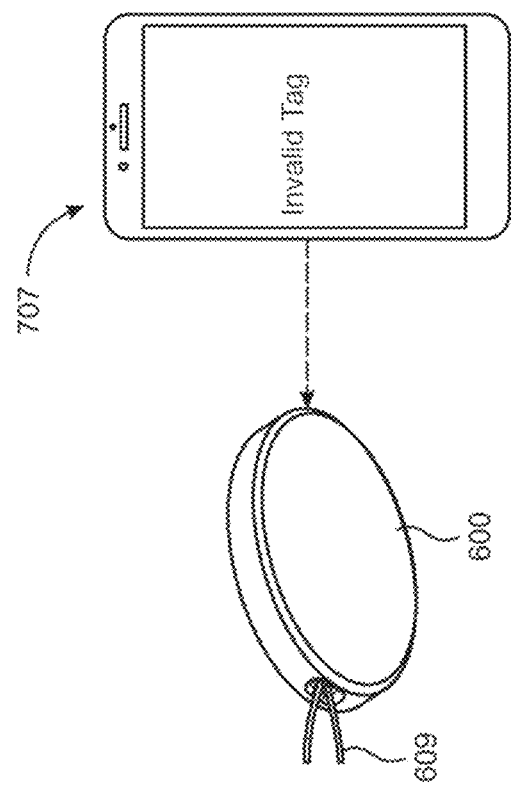
Figure 7B:
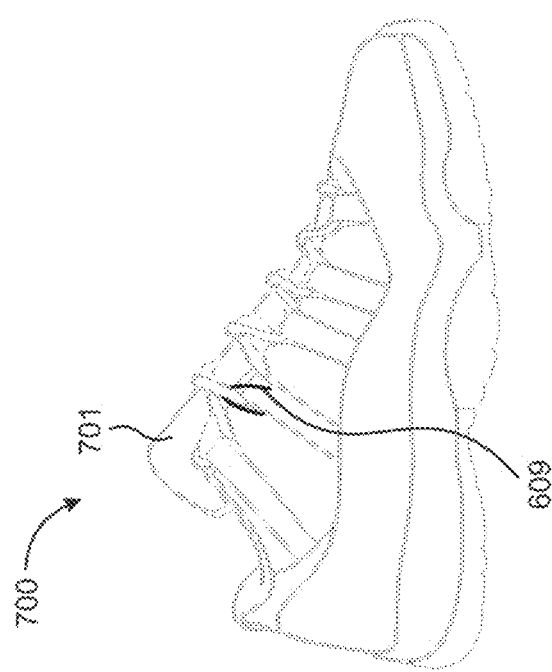
Figure 8:
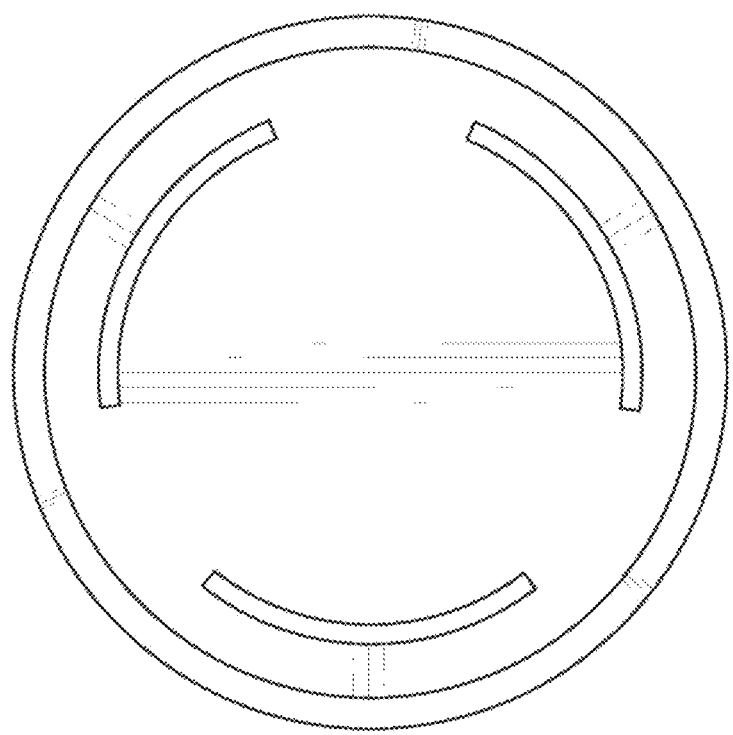
Figure 9:
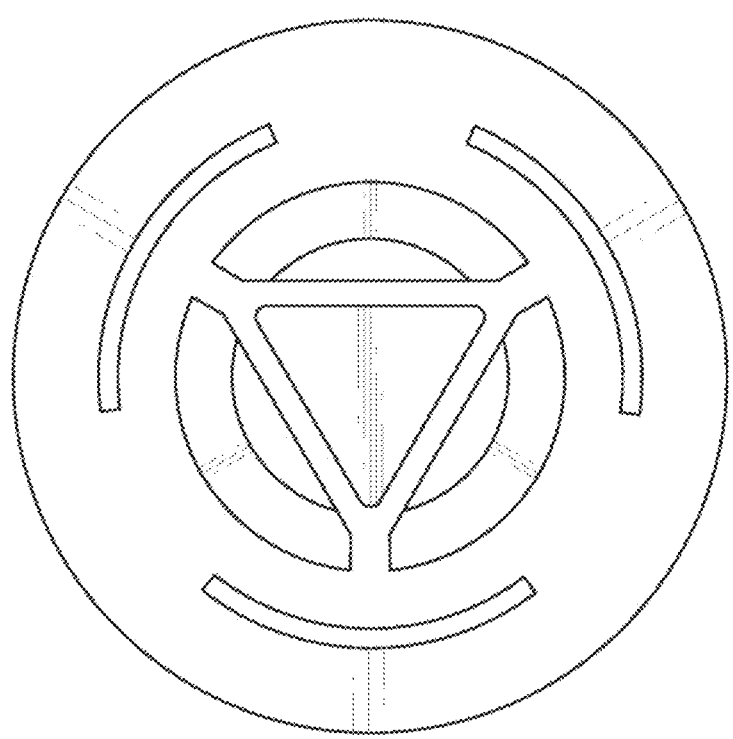
Figure 10:
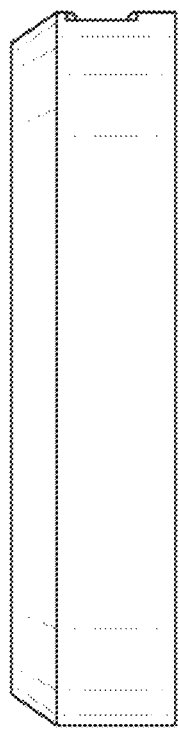
Figure 11:
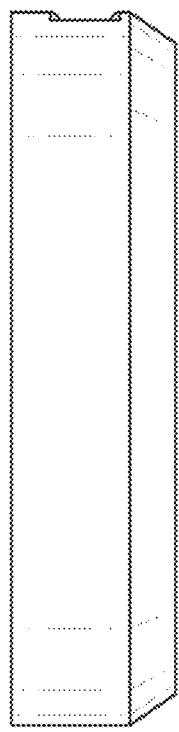
Figure 12:
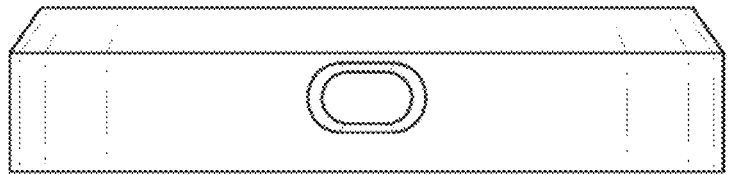
Figure 13:
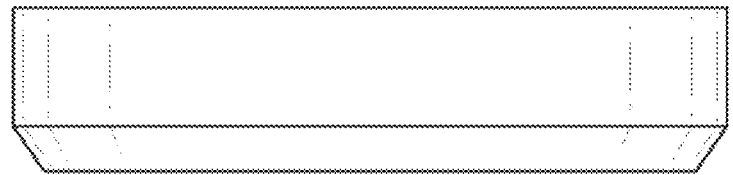

Having thus described example embodiments of the invention in general terms, reference will now be made to the accompanying drawings, which are not necessarily drawn to scale, and wherein:

FIG. 1 illustrates a schematic block diagram of a system for authentication of a product, in accordance with one or more example embodiments;

FIG. 2 exemplarily illustrates a block diagram of a communication diagram depicting working of the system as illustrated in FIG. 1, in accordance with one or more example embodiments;

FIG. 3 illustrates a schematic block diagram of a device for authentication of a product, in accordance with one or more example embodiments;

FIGS. 4A-4C illustrate schematic diagrams depicting working of a device for authentication of a product, in accordance with one or more example embodiments;

FIG. 5 illustrates a flowchart of a method for authentication of a product, in accordance with one or more example embodiments;

FIGS. 6A-6B illustrate schematic structural diagrams of an authentication tag used in authentication of a product, in accordance with one or more example embodiments;

FIG. 7A illustrates a sneaker to which the authentication tag of FIGS. 6A-6B is attached, in accordance with one or more example embodiments;

FIG. 7B illustrates display of an error message when the authentication tag is detached from the sneaker of FIG. 7, in accordance with one or more example embodiments;

FIG. 8 illustrates a front view of the identification tag of FIGS. 6A-6B, in accordance with one or more example embodiments;

FIG. 9 illustrates a back view of the identification tag of FIGS. 6A-6B, in accordance with one or more example embodiments;

FIG. 10 illustrates a right-side view of the identification tag of FIGS. 6A-6B, in accordance with one or more example embodiments;

FIG. 11 illustrates a left-side view of the identification tag of FIGS. 6A-6B, in accordance with one or more example embodiments;

FIG. 12 illustrates a top view of the identification tag of FIGS. 6A-6B, in accordance with one or more example embodiments; and FIG. 13 illustrates a bottom view of the identification tag of FIGS. 6A-6B, in accordance with one or more example embodiments.

DETAILED DESCRIPTION

In the following description, for purposes of explanation, numerous specific details are set forth to provide a thorough understanding of the present disclosure. However, it will be apparent to one skilled in the art that the present disclosure may be practiced without these specific details, as long as the elements of the invention are used. In other instances, devices and methods are shown in block diagram form to effectively communicate without obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for purposes of description and should not be regarded as limiting. Any heading utilized within this description is for convenience only and has no legal or limiting effect.

As used in this specification and claims, the terms "for example," "For instance," and "such as, and the verbs "comprising" "having" "including," and their other verb forms, when used in conjunction with a listing of one or more components or other items, are each to be construed as open ended, meaning that that the listing is not to be considered as excluding other, additional components or items. Other terms are to be construed using their broadest reasonable meaning unless they are used in a context that requires a different interpretation.

The term 'authenticator' may be used to refer to an individual who may authenticate a product using a system for authentication of a product.

The term 'authentication application' may be used to refer to a mobile application or a web application executable on a mobile device.

The term 'logged-on authenticator' may be used to refer to a verified authenticator who is granted access to the authentication application.

The term 'authentication tag' may be used to refer to a device detachably connected to a product and may provide details of the product upon (the device) being scanned.

FIG. 1 illustrates a schematic block diagram of a system 100 for authentication of a product, in accordance with one or more example embodiments. As depicted in the embodiment illustrated in FIG. 1, system 100 may include a user device 101 and a database 103. Additional, fewer, or different components may also be possible. In some example embodiments, system 100 may include a plurality of databases. The components described in system 100 may further be broken down into more than one component and/or combined together in any suitable arrangement. Further, the components may be rearranged, changed, added, and/or removed.

User device 101 may be any user accessible device, such as, but not limited to, a mobile phone, a smartphone, and a portable computer that is portable in itself or as a part of another portable/mobile object. User device 101 may be configured to scan an authentication tag attached to the product to display data of the product.

User device 101 may include at least one processor, at least one memory, and a communication interface. Additional, different, or fewer components may be provided. For example, user device 101 may be configured to execute and run mobile applications such as, but not limited to an authentication application, a messaging application, a browser application, an imaging application. User device 101 may be configured to run the authentication application.

The processor of user device 101 may be embodied in a number of different ways. For example, the processor of user device 101 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip.

The memory of user device 101 may be non-transitory and may include, for example, one or more volatile and/or non-volatile memories. For example, the memory may be an electronic storage device (for example, a computer readable storage medium) including gates configured to store data (for example, bits) that may be retrievable by a machine (for example, a computing device like the processor).

The communication interface of user device 101 may include input interface and output interface for supporting communications to and from user device 101. The communication interface may be any means such as a device or circuitry embodied in either hardware or a combination of hardware and software that is configured to receive and/or transmit data to/from a communications device in communication with user device 101.

System 100 may include one or more physical packages (for example, chips) including materials, components and/or wires on a structural assembly (for example, a baseboard). The structural assembly may provide physical strength, conservation of size, and/or limitation of electrical interaction for component circuitry included thereon.

Database 103 may store data of one or more products. The one or more products may be computers, mobile phones, entertainment equipment (such as an Xbox or play station), cameras, household furniture, washing machines and dishwashers, clothing, footwear (such as sneakers), sports equipment. The data of one or more products may include type of the product, color of the product, dimensions of the product, data of purchase of product. Database 103 may be configured to store data of one or more products according to product category.

In some additional or alternative example embodiments, database 103 may include one or more images of each of the one or more products, so that the system may be configured to conduct the authentication of the product by means of comparison of the one or more products with the corresponding one or more images stored in database 103. The one or more images of each of the one or more products may be provided by manufacturers and/or sellers.

Database 103 may further be configured to store data of one or more users and data of one or more authentication tags. The data of one or more users may include login credentials of each of the one or more users. The login credentials may include user name and password, facial scan data, finger scan data and retinal scan data. The data of the one or more users may be in accordance with type of each of the one or more users. The data of one or more users may further include details of each of the one or more users. The details of each of the one or more users may include name, address, date of birth, gender, functionality and contact number. In some example embodiments, database 103 may include transactional data generated by the one or more users while buying the one or more products or by filling up registration forms.

In some example embodiments, the one or more authentication tags may include a bar code, a QR code, a holographic image, a near field communication authentication tag. The one or more authentication tags may be disposed on surface of the one or more products. The one or more authentication tags may be pre-programmed and may be configured to provide electronically readable data of the product upon being scanned. Each of the one or more authentication tags may be encoded with unique data. Database 103 may be configured to host the authentication application.

User device 101 may be communicatively coupled to database 103, via a network 105. All components of system 100 may be coupled, either directly or indirectly, to network 105. Network 105 may be wired, wireless, or any combination of wired and wireless communication networks, such as cellular, Wi-Fi, internet, local area networks. In one embodiment, network 105 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, or any combination thereof.

In addition, the wireless network may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G New Radio networks, ITU-IMT 2020 networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET).

FIG. 2 illustrates a block diagram of a communication diagram 200 depicting working of a system 21 for authentication of a product, in accordance with one or more example embodiments of the present invention. As shown in exemplary embodiment of diagram 200, a user device 201 may be communicatively coupled to a plurality of databases, such as a first database 207, a second database 209 and a third database 211. In some alternate embodiments, system 21 may include only one database that may be configured to carry out functionalities of each of first database 207, second database 209 and third database 211 for purpose of working of system 21. First database 207 may be configured to store data of one or more users, and data of one or more authentication tags. Second database 209 may be configured to store data of one or more products.

User device 201 may be configured to run an authentication application. The authentication application run on user device 201 may be configured to provide a login screen to an authenticator 213. User device 201 may be configured to receive credentials like a user ID, a password, a fingerprint or facial scan from an authenticator. User device 201 may be configured to compare the received credentials with the data of one or more users stored in first database 207. Upon matching the credentials with the stored data of one or more users, user device 201 may provide a notification to authenticator 213 that the authenticator is qualified to perform the authentication. Once the authenticator is verified, user device 201 may be configured to receive user search data from authenticator 213.

User device 201 may enable authenticator 213 to enter the user search data in a user search window. On receiving the user search data, user device 201 may be configured to search for a user from first database 207 based on the user search data. Further, user device 201 may be configured to communicate with second database 209 to search for a product which the user selects for authentication, based on product search data of the product. The user device 201 may receive the product search data from the authenticator through a product search window. Upon finding the product, user device 201 may be configured to scan an authentication tag attached to the product.

In some example embodiments, the authentication tag may be pre-programmed and may become inactive when detached from the product. To this end, the authentication tag may be equipped with engaging switches that are activated only when the tag is attached to the product. In some example embodiments, the authentication tag may include proximity sensors that may sense stimuli and thus activate the tag when it is within a threshold distance from the stimuli. The stimuli may utilize near field communication with the sensors and may be an electromagnetic, ferromagnetic or any suitable material or electronic component that may engage with the sensors to activate them. Upon scanning, user device 201 may be configured to control a display device to display data of the product. In some example embodiments, the data of the at least product include one or more of type of the product, color of the product, dimensions of the product, or data of purchase of product. User device 201 may further provide an authentication mark, post authentication of the product, in the data of the product. In some example embodiments, the product may be pre-authenticated.

In some example embodiments, the product may be a subject of a sale transaction or a resale transaction, and the subject of the sale transaction or the resale transaction may be a sneaker. In these embodiments, user device 201 may be configured to receive product search data of the sneaker; search the sneaker in the one or more databases based on the product search data and authenticate the sneaker by scanning an authentication tag attached to the sneaker.

FIG. 3 illustrates a schematic block diagram of a device 300 for authentication of a product, in accordance with one or more example embodiments of the present invention. Device 300 may include circuitry required for specific functionalities of device 300. The circuitry may include at least one processor 301, at least one memory 303, and a communication interface 305. Additional, fewer, or different components may also be possible.

In some example embodiments, device 300 may be embodied as a chip or chip set. In other words, device 300 may include one or more physical packages (for example, chips) including materials, components and/or wires on a structural assembly (for example, a baseboard). The structural assembly may provide physical strength, conservation of size, and/or limitation of electrical interaction for component circuitry included thereon. Device 300 may therefore, in some cases, be configured to implement an example embodiment of the present invention on a single "system on a chip." As such, in some cases, a chip or chipset may constitute a means for performing one or more operations for providing the functionalities described herein.

At least one processor 301 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip. As such, in some embodiments, the processor may include one or more processing cores configured to perform independently. A multi-core processor may enable multiprocessing within a single physical package. Additionally, or alternatively, the processor may include one or more processors configured in tandem via the bus to enable independent execution of instructions, pipelining and/or multithreading.

The at least one memory may be a non-transitory and may include, for example, one or more volatile and/or non-volatile memories. For example, memory 303 may be an electronic storage device (for example, a computer readable storage medium) including gates configured to store data (for example, bits) that may be retrievable by a machine (for example, a computing device like the processor). Memory 303 may be configured to store information, data, content, applications, instructions, for enabling the device to carry out various functions in accordance with an example embodiment of the present invention. For example, memory 303 could be configured to buffer input data for processing by the processor. Additionally, or alternatively, memory 303 may be configured to store instructions for execution by the processor.

Processor 301 (and/or co-processors or any other processing circuitry assisting or otherwise associated with processor 401) may be in communication with memory 303 via a bus for passing information among components of device 300. Processor 301 may be configured to execute instructions stored in memory 303 or otherwise accessible to processor 301. Additionally, or alternatively, processor 301 may be configured to execute hard coded functionality. Whether configured by hardware or software methods, or by a combination thereof, processor 301 may represent an entity (for example, physically embodied in circuitry) capable of performing operations according to an embodiment of the present invention while configured accordingly. Thus, for example, when processor 301 is embodied as an ASIC or FPGA, processor 301 may be specifically configured with hardware for conducting the operations described herein. Alternatively, as another example, when processor 301 is embodied as an executor of software instructions, the instructions may specifically configure processor 301 to perform the algorithms and/or operations described herein when the instructions are executed. Processor 301 may include, among other things, a clock, an arithmetic logic unit (ALU) and logic gates configured to support operation of device 300.

Communication interface 305 may include input interface and output interface for supporting communications to and from device 300. The communication interface 305 may be any means such as a device or circuitry embodied in either hardware or a combination of hardware and software that is configured to receive and/or transmit data to/from a communications device in communication with device 300. In this regard, communication interface 305 may include, for example, an antenna (or multiple antennae) and supporting hardware and/or software for enabling communications with a wireless communication network.

Additionally, or alternately, communication interface 305 may include the circuitry for interacting with the antenna(s) to cause transmission of signals via the antenna(s) or to handle receipt of signals received via the antenna(s). In some environments, communication interface 305 may alternatively or additionally support wired communication. As such, for example, communication interface 305 may include a communication modem and/or other hardware and/or software for supporting communication via cable, digital subscriber line (DSL), universal serial bus (USB) or other mechanisms.

In some example embodiments, device 300 may include one or more sensors 307 for capturing data for authentication of the product. Sensors 307 may include imaging sensors (such as a camera or a charge coupled device sensor), proximity sensors (such as electromagnetic sensor photoelectric sensor, or capacitive sensor), and positioning sensors (such as a GPS sensor). Additionally, or optionally, device 300 may include additional hardware such as a power source, antenna, user interface that may be required for executing the authentication of the product.

FIGS. 4A-4C illustrate schematic diagrams 400A-400C depicting working of a device for authentication (similar to device 300 of FIG. 3) of a product, in accordance with one or more example embodiments. The device may include an authentication application executable on the device. Referring to schematic diagram 400A of FIG. 4A, on execution of the authentication application, the device may display a login screen to receive credentials of an authenticator. The login screen may include user field 401 and password field 403 to provide the credentials. The credentials may include user ID and password of the authenticator. Further, the device may provide a button 405 to enable the authenticator to login to the authentication application after providing the credentials.

The device may further provide a product-display page 407. The product-display page 407 may include multiple page sections. The multiple page sections may include a product-list display 409. Product-list display 409 may include a default landing page configured to display a product list for product-display page 407. Further, the device may include an all products tab 411 that may be configured to display all products listed on the product list. Further, product-display page 407 may include a recent products tab 413 that may be configured to display recent products sold or purchased. Further, the authentication application may include a trending tab 415. Trending tab 415 may be configured to display products that may be trending currently, such as, for the prior 24-36 hours, or products that are being discussed currently in social media, in news.

Further, product-display page 407 may also include a search tab 417. The authentication application may be configured to enable a logged-on authenticator to search for products by entering specific product names and manufacturers in the search tab 417. Product-display page 407 may also include a change-view tab 419 through which the authentication application may be configured to enable the logged-on authenticator to change display settings, for example, from grid to a continuous list view. Further, the device may include a filter tab 421 that may enable the logged-on authenticator to filter products by size, color, date of manufacture, delivery time, etc. Product-display page 407 may further include an authentication tab 423, which on selection opens a to-be-described authentication screen.

Referring to schematic diagram 400B of FIG. 4B, the authentication program executed on the device may include a user look-up page 425. User look-up page 425 may include a user-search bar 427 that may be configured to enable the logged-on authenticator to add his/her name to display results in a display area 429. Display area 429 may be configured to display lists of name of users and other desired user details. Further, display area 419 may be configured to enable the logged-on authenticator to navigate to user-details page 431 by clicking on a specific name from the lists of names of users displayed on display area 419. User-details page 431 may include a button 433 that may be configured to enable the logged-on authenticator to select a user. User-details page 431 may be configured to display a list of pertinent or desired details of the user as selected by the logged-on authenticator.

Referring to schematic diagram 400C of FIG. 4C, the authentication program executed on the device may include an authentication page 435. Authentication page 435 may include a product-search tab 437 configured to enable the logged-on authenticator to search and choose a product. Authentication page 435 may further include a product-display area 439 configured to display all products and their details matching search criteria. Authentication page 435 may further include authentication tab 423. On clicking authentication tab 423, the device may be configured to display an authentication pop-up 441 that may be configured to provide the logged-on authenticator an instruction on how to perform authentication. The device may perform authentication upon being tapped by the logged-on user on a tag. The tag may be a short-range-wireless-communication tag, for example, a near-field-communication (NFC) tag. The tag may be programmed so that it cannot function when not suitably attached to a to-be-authenticated product.

FIG. 5 illustrates a flowchart depicting a workflow, according to one or more example embodiments. Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

FIG. 5 illustrates a flowchart illustrative of a method 500 for authentication of a product, in accordance with one or more example embodiments. At step 501, method 500 may include receiving login credentials of an authenticator. A device (e.g. user device 201) may be configured to receive the login credentials. In some example embodiments, the login credentials may include one or more of a user name and a password, facial scan data, finger scan data or retinal scan data of the authenticator. User device 201 may be configured to transmit the login credentials to a database for comparing the login credentials received from the authenticator with data stored in the database. Method 500 for authentication of a product, at step 503, may include receiving user search data of a user from the authenticator through a user-search window. Upon verification of the login credentials, user device 201 may be configured to provide the authenticator to choose a user by entering the user's name in the search window. The user is one of listed users. Further, method 500 may include, at step 505, searching the user in the one or more databases based on the user-search data.

At step 507, method 500 may include receiving product search data of a product which the user selected for authentication, from the authenticator. User device 201 may be configured to provide the authenticator with a product search window through which user device 201 may enable the authenticator to enter the product search data. In one or more example embodiments, the product is pre-authenticated. Further, at step 509, method 500 may include searching the product in one or more database based on the product search data. At step 511, method 500 may include scanning an authentication tag attached to the product. In one or more example embodiments, the authentication tag may include one of a bar code, a QR code, a holographic image, or a near field communication authentication tag. Further, method 500, at step 513, may include authenticating the product based on the scanning of the authentication tag. In some example embodiments, the authentication tag may be pre-programmed and may become inactive when detached from the product.

Additionally, various other steps not shown in FIG. 5 may also be included in the method illustrated in flowchart 500. For example, method 500 for authentication of a product may further include displaying data of the product based on scan of the authentication tag. In some example embodiments, the data of the product may include one or more of type of the product, color of the product, dimensions of the product, or data of purchase of product. Method 500 may further include providing an authentication mark, post authentication of the product, in the data of the product. Method 500 may further include verifying that the authenticator is qualified to perform the authentication.

In some example embodiments, the product may be a subject of a sale transaction or a resale transaction. The subject of the sale transaction or the resale transaction may be a sneaker. In these embodiments, method 500 may include receiving product search data of the sneaker; searching the sneaker in the one or more databases based on the product search data; and authenticating the sneaker by scanning an authentication tag attached to the sneaker.

In an example embodiment, a system for performing method of FIG. 5 above may include a user device (e.g. user device 101) configured to perform some or each of the operations (501-513) described above. The user device may, for example, be configured to perform the operations (501-

513) by performing hardware implemented logical functions, executing stored instructions, or executing algorithms for performing each of the operations. Alternatively, the system may include means for performing each of the operations described above. In this regard, according to an example embodiment, examples of means for performing operations 501-513 may include, for example, user device 101 and/or a device or circuit for executing instructions or executing an algorithm for processing information as described above.

FIGS. 6A-6B illustrate schematic structural diagrams of an authentication tag 600 for authentication of a product, in accordance with one or more example embodiments of the present invention. Tag 600 may include a front unit 603 and a rear unit 605. Both front unit 602 and rear unit 604 may be made from any suitable material, such as a composite, reinforced composite, metal, or combination thereof. Tag 600 may further include an inner unit 607 configured to be placed in between front unit 603 and rear unit 605. Inner unit 607 may include a short-range-wireless-communication chip or a near field communication chip for communicating with other devices.

Tag 600 may further include a tag module or a thread 609 wrapped on periphery of rear unit 605 for threading through a spacing 611 provided on front unit 603. Thread 609 may be in the form of a string or strap. Rear unit 605 may also include a plurality of locking ridges 613 configured to lock rear unit 605 and front unit 603 using a locking tool. The tag body has top, bottom and side surfaces that includes the front unit 603 and the rear unit 605 and define a three-dimensional shape. The shape of the authentication tag may be a disc, or any other polygon. For locking, as illustrated in FIG. 6B, front unit 603 and rear unit 605 may pass through the tag module 609. For locking, front unit 603 may include a plurality of locking teeth 615. After closure, teeth 615 may be rotated when plurality of locking ridges 613 are rotated using locking tool. Locking mechanism as mentioned above may tighten tag module 609. Final state device 617 may refer to final state of the tag 600 after valid authentication.

FIGS. 7A-7B illustrates exemplary scenarios in which the authentication 600 tag is attached to a sneaker 700 and detached from the sneaker 700, respectively. Although a sneaker is shown as the product in FIGS. 7A-7B, the authentication tag may be operable with any suitable product for authentication as per example embodiments of the present disclosure. A scanning device 707 may perform authentication upon being tapped by authentication tag 600 attached to sneaker 700. Authentication tag may be a short-range-wireless-communication tag, for example, a near-field-communication (NFC) tag. Authentication tag 600 can be attached to any part of sneaker 700. Authentication tag 600 may be connected to any part of the sneaker such as tongue, heel cap, sole, welt, toe box, or throat.

In some example embodiments, pin and tube engagement assemblies may help secure the strap of the authentication tag around the sneaker. Such assemblies may function as a circuit-breakers for the internal circuitry of authentication tag 600 such that when the tag is detached from the sneaker, i.e. the pin tube assembly is disengaged, the internal circuitry, for example an NFC circuitry may not operate, thereby rendering the authentication tag inoperable. In some example embodiments, the disengagement of the pin-tube assembly may trigger a separate circuitry inside the tag which transmits error/invalid message when scanned by a scanning device. Although, NFC may be the prevalent electronic communication means for the authentication tag, various other modes to communicate the error/invalid message may be possible within the scope of the disclosure.

In some example embodiments, the tag may be programmed so that it does not function when not suitably attached to a to-be-authenticated product. When authentication tag 600 is not suitably attached or is detached from sneaker 700, the internal circuitry of the tag may be broken thereby making the tag inoperable. The scanning of a detached tag may result in display of an invalid tag message on the display of a scanning device 707 as is shown in FIG. 7B. In some example embodiments, the thread 609 may comprise a cable which if broken, may cause the tag to be inoperable.

In some example embodiment, NFC components may be active NFC, passive NFC or any combination thereof. Active NFC coupled with the scanning device provides a two way handshake to validate a communication between authentication tag 600 and scanning device 707. This way a more secure authentication tag which works only when attached to the product may be provided.

FIG. 8-13 illustrate various views of the authentication tag 600 of FIGS. 6A-6B. As noted in the Brief Description of the Drawings, those figures show the look of authentication tag 600 from all views so that the entire look of that tag is disclosed.

In this way, example embodiments of the present invention may result in prevention of counterfeiting of goods. Since the present invention enables an authenticator to determine whether a product is genuine or not by means of scanning an authentication tag attached in the product, purchase of counterfeits may be reduced. Further, the present invention may prevent hazards that may be caused to health and safety of consumers due to purchase and use of counterfeits.

The invention may also be described in the following numbered paragraphs.

1. An authentication device, comprising:
  at least one memory configured to store computer executable instructions; and
  at least one processor configured to execute the computer executable instructions to:
  receive from an authenticator, product search data of a product;
  search the product in one or more databases based on the product search data, wherein the product is listed by a user for authentication; and
  authenticate the product by scanning an authentication tag attached to the product, wherein the authentication tag is pre-programmed and becomes inactive when detached from the product.

2. The device of paragraph 1, wherein the at least one processor is further configured to display data of the product based on the scan of the authentication tag.

3. The device of paragraph 2, wherein the data of the product comprise one or more of a type of the product, a color of the product, dimensions of the product, or data of purchase of the product.

4. The device of paragraph 1, wherein the at least one processor is further configured to verify that the authenticator is qualified to perform the authentication.

5. The device of paragraph 1, wherein to receive the product search data, the at least one processor is configured to:
  receive login credentials of the authenticator;
  provide a user-search window to receive, from the authenticator, user-search data of the user;

search the user in the one or more databases based on the user-search data, wherein the user is one of listed users; and provide a product-search window to receive, from the authenticator, product-search data of the product.

6. The device of paragraph 5, wherein the login credentials comprise one or more of a user name and a password, facial scan data, finger scan data or retinal scan data.

7. The device of paragraph 1, wherein the authentication tag is one of a bar code, a QR code, a holographic image, or a near field communication authentication tag.

8. The device of paragraph 1, wherein the product is a subject of one of a sale transaction or a resale transaction.

9. The device of paragraph 9, wherein the subject of the one of the sale transaction or the resale transaction is a sneaker.

10. The device of paragraph 9, wherein the at least one processor is further configured to:

receive the product search data of the sneaker;

search the sneaker in the one or more databases based on the product search data; and authenticate the sneaker by scanning an authentication tag attached to the sneaker.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and sub-combinations of the various elements, features, functions, and/or properties disclosed herein. The following claims particularly point out certain combinations and sub-combinations regarded as novel and nonobvious. Inventions embodied in other combinations and sub-combinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

What is claimed is:

1. An authentication tag comprising:
a communication chip and internal circuitry associated with the communication chip;
a body that includes a front unit, a rear unit, and an inner unit, the inner unit configured to be placed between the front unit and the rear unit, and the inner unit including the communication chip and the internal circuitry associated with the communication chip; and
a strap configured to secure the body of the authentication tag to a product via a pin and tube engagement assembly, wherein the internal circuitry is programmed to cause the communication chip to:
communicate an indication of an authenticity of the product to a scanning device when scanned by the scanning device based on the pin and tube engagement assembly being engaged; and
suspend the communicating of the indication of the authenticity of the product to the scanning device based on the pin and tube engagement assembly being disengaged.

2. The authentication tag of claim 1, wherein the communication chip comprises a near-field-communication (NFC) chip.

3. The authentication tag of claim 2, wherein the communication chip comprises an active NFC chip.

4. The authentication tag of claim 2, wherein the communication chip comprises a passive NFC chip.

5. The authentication tag of claim 1, wherein the communication chip comprises a short-range-wireless-communication chip.

6. The authentication tag of claim 1, wherein detaching the strap from the product disengages the pin and tube engagement assembly causing the internal circuitry to be inoperable.

7. The authentication tag of claim 1, wherein detaching the strap from the product disengages the pin and tube engagement assembly causing a separate internal circuitry to transmit an error message when the authentication tag is scanned by the scanning device.

8. The authentication tag of claim 7, wherein transmitting the error message to the scanning device causes the error message to be displayed at the scanning device.

9. The authentication tag of claim 1, wherein the front unit and the rear unit of the body define a three-dimensional shape.

10. The authentication tag of claim 9, wherein the three-dimensional shape comprises one of a sphere, torus, cylinder, cone, cube, cuboid, triangular pyramid, square pyramid, or triangular prism.

11. The authentication tag of claim 9, wherein a shape of the authentication tag is a disk.

12. The authentication tag of claim 1, wherein the strap is formed with opposing ends, with a first end being detachably connected to the body, threadable through a part of the product, and reattachable to the body, thereby to couple the body to the product.

13. The authentication tag of claim 1, wherein to suspend the communicating of the indication of the authenticity of the product causes a message to be displayed at the scanning device when scanned by the scanning device.

14. The authentication tag of claim 1, wherein to communicate the indication of the authenticity of the product to the scanning device when scanned by the scanning device causes data of the product to be displayed by the scanning device, and wherein the data comprises at least one of a type of the product, a color of the product, one or more dimensions of the product, or data associated with a purchase of the product.

15. A device comprising:
   programmable circuitry;
   a body that encloses the programmable circuitry, wherein the body includes an expanse that can receive and present branding information to associate a brand with an authenticity of a product; and
   an elongated connector that couples the body to the product via a pin and tube engagement assembly, wherein the programmable circuitry is programmed to:
   communicate an indication of the authenticity of the product when scanned by a scanning device; and
   suspend the communicating of the indication of the authenticity of the product to the scanning device based on the pin and tube engagement assembly being disengaged.

16. The device of claim 15, wherein the body has top, bottom and side surfaces that define a three-dimensional shape.

17. The device of claim 16, wherein the three-dimensional shape comprises one of a sphere, torus, cylinder, cone, cube, cuboid, triangular pyramid, square pyramid, or triangular prism.

18. The device of claim 16, wherein the three-dimensional shape is a disc.

19. The device of claim 15, wherein the elongated connector is formed with opposing ends, with a first end being detachably connected to the body, threadable through a part of the product, and reattachable to the body, thereby to couple the body to the product.

20. The device of claim 15, wherein to suspend the communicating of the indication of the authenticity of the product causes a message to be displayed at the scanning device when scanned by the scanning device.

\* \* \* \* \*